US012597146B2

(12) United States Patent
Iseki

(10) Patent No.: US 12,597,146 B2
(45) Date of Patent: Apr. 7, 2026

(54) INFORMATION PROCESSING APPARATUS AND CONTROL METHOD THEREOF

(71) Applicant: CANON KABUSHIKI KAISHA, Tokyo (JP)

(72) Inventor: Akane Iseki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 247 days.

(21) Appl. No.: 18/524,039

(22) Filed: Nov. 30, 2023

(65) Prior Publication Data

US 2024/0185433 A1 Jun. 6, 2024

(30) Foreign Application Priority Data

Dec. 6, 2022 (JP) .................................. 2022-195012

(51) Int. Cl.
| | |
|---|---|
| *G06T 7/238* | (2017.01) |
| *G06V 10/75* | (2022.01) |
| *G06V 10/77* | (2022.01) |
| *G06V 10/82* | (2022.01) |
| *G06V 20/40* | (2022.01) |

(52) U.S. Cl.
CPC ............ *G06T 7/238* (2017.01); *G06V 10/751* (2022.01); *G06V 10/7715* (2022.01); *G06V 10/82* (2022.01); *G06V 20/40* (2022.01)

(58) Field of Classification Search
CPC ........... G06T 7/238; G06T 2207/20021; G06T 2207/20084; G06T 7/246; G06V 10/751; G06V 10/7715; G06V 10/82; G06V 20/40; G06V 20/52; G06V 40/103

USPC ........................................................ 382/100
See application file for complete search history.

(56) References Cited

U.S. PATENT DOCUMENTS

| | | | | |
|---|---|---|---|---|
| 2012/0275703 A1* | 11/2012 | Lv | .......................... | G06T 3/4053 |
| | | | | 382/173 |
| 2018/0129934 A1* | 5/2018 | Tao | ....................... | G06V 10/255 |
| 2018/0260415 A1* | 9/2018 | Gordo Soldevila | ......................... | |
| | | | | G06F 16/5838 |
| 2020/0410669 A1* | 12/2020 | Psota | .................... | G06T 7/0012 |

(Continued)

OTHER PUBLICATIONS

Felzenszwalb, P. et al., "Efficient Graph-Based Image Segmentation" IJCV 2004 (Sep. 2004) pp. 167-181, vol. 59, No. 2.

(Continued)

*Primary Examiner* — Stephen P Coleman
(74) *Attorney, Agent, or Firm* — Carter, DeLuca & Farrell LLP

(57) ABSTRACT

An information processing apparatus sets a first area and a second area corresponding to image areas of a tracking target, which are different from each other, for a template image included in a video sequence and including an image of the tracking target. The apparatus extracts a first area feature and a second area feature from the first area and the second area using a feature extraction NN, extracts a search area feature from a search area image using the feature extraction NN, and performs correlation calculation and deriving a first feature correlation map and a second feature correlation map. The apparatus integrates the first feature correlation map and the second feature correlation map and deriving an integrated feature, and detects the tracking target from the search area image based on the integrated feature.

13 Claims, 13 Drawing Sheets

(56) References Cited

U.S. PATENT DOCUMENTS

2023/0111393 A1    4/2023  Iseki

OTHER PUBLICATIONS

Jiang, B. et al., "Acquisition of Localization Confidence for Accurate Object Detection" ECCV2018 (Oct. 2018) pp. 1-16.
Li, B. et al., "High Performance Visual Tracking with Siamese Region Proposal Network" CVPR2018 (Jun. 2018) pp. 8971-8980.
Tian, Z. et al., "FCOS: Fully Convolutional One-Stage Object Detection" ICCV2019 (Apr. 2019) pp. 9627-9636.

* cited by examiner

CPU

102

ROM

103

RAM

104

STORAGE UNIT

105

INPUT UNIT

106

DISPLAY UNIT

107

COMMUNICATION UNIT

F I G. 2
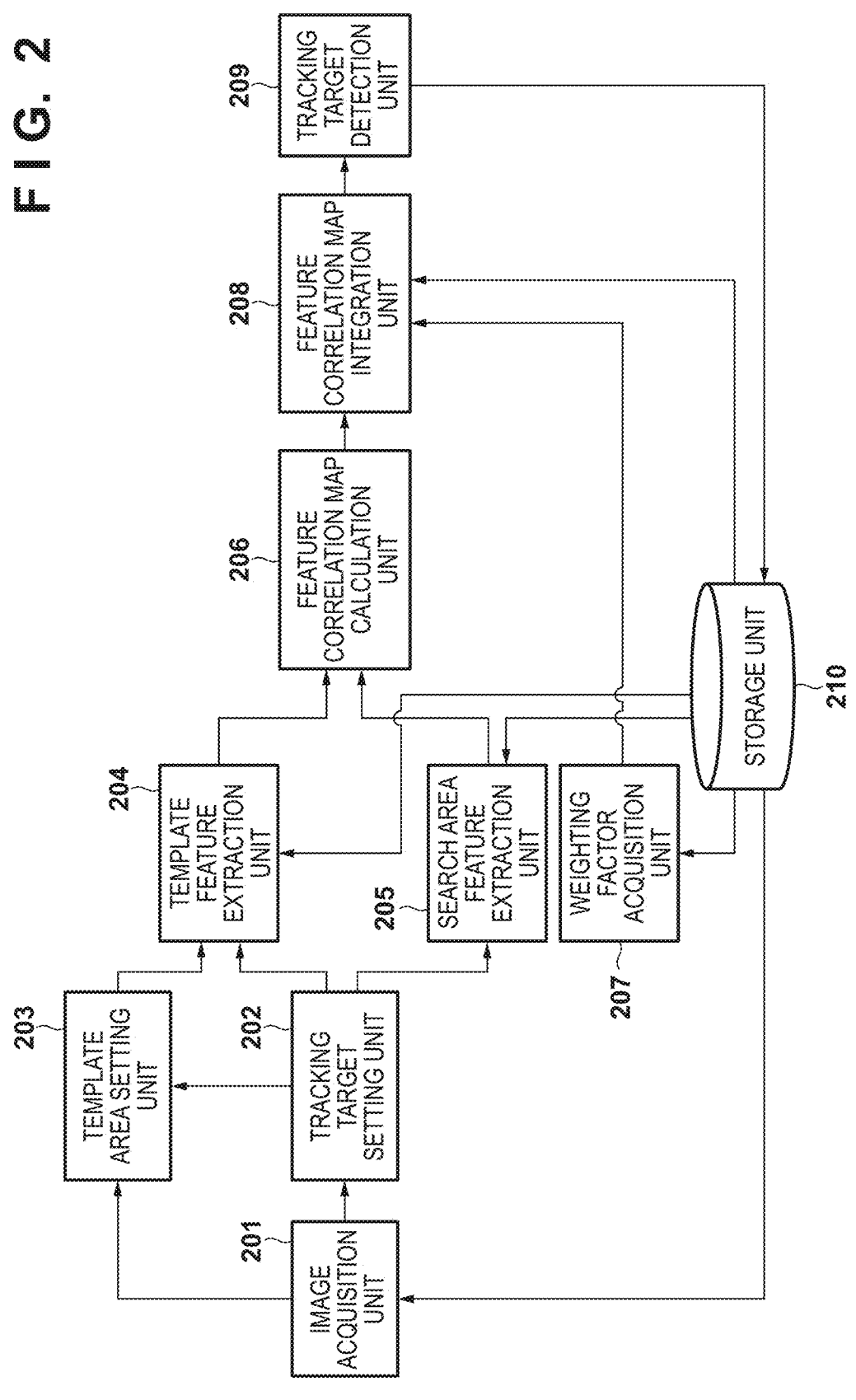

F I G. 4
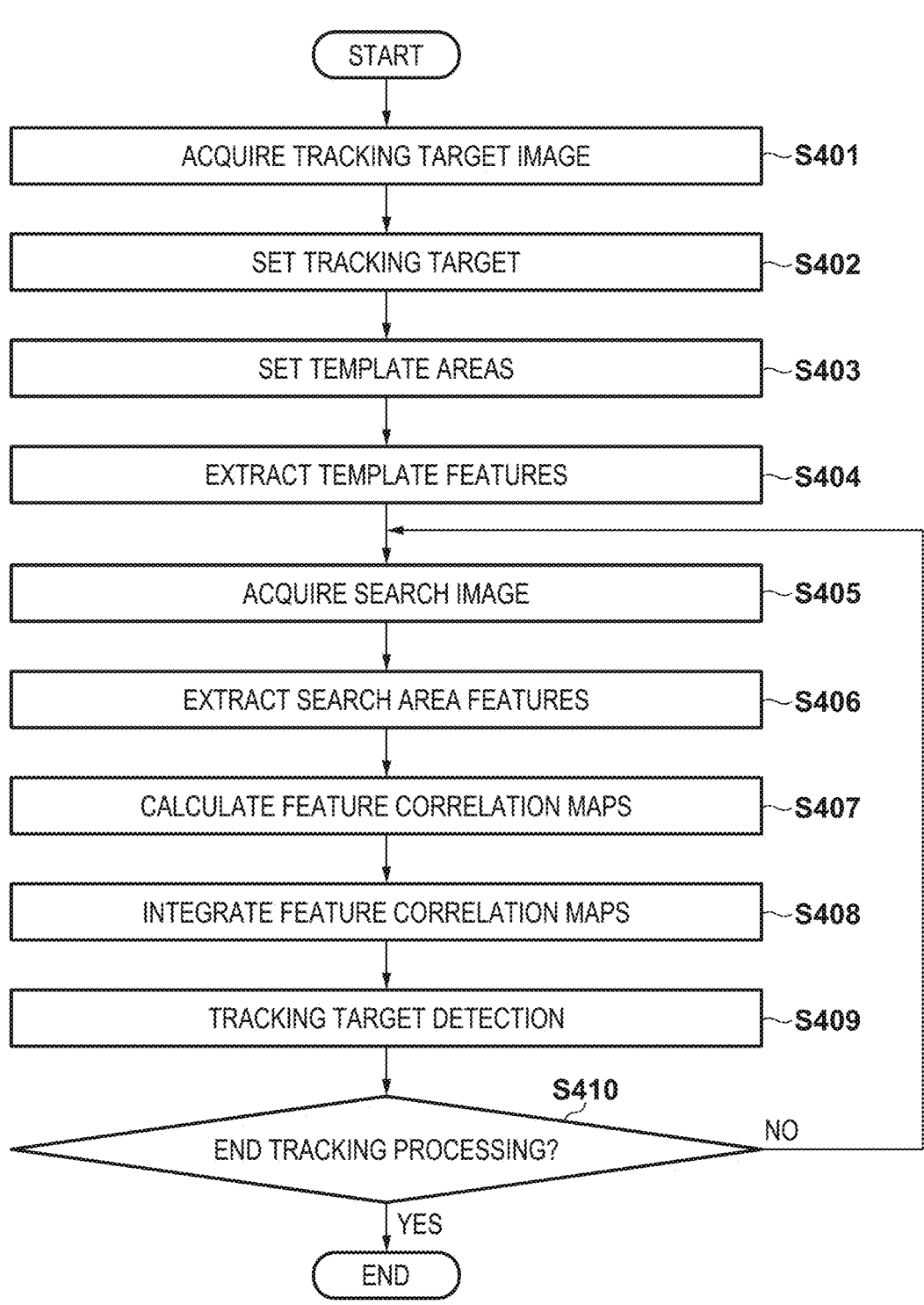
START
ACQUIRE TRACKING TARGET IMAGE — S401
SET TRACKING TARGET — S402
SET TEMPLATE AREAS — S403
EXTRACT TEMPLATE FEATURES — S404
ACQUIRE SEARCH IMAGE — S405
EXTRACT SEARCH AREA FEATURES — S406
CALCULATE FEATURE CORRELATION MAPS — S407
INTEGRATE FEATURE CORRELATION MAPS — S408
TRACKING TARGET DETECTION — S409
S410
END TRACKING PROCESSING?    NO
YES
END

F I G. 5A
503   502   501
504
F I G. 5B
507   506   505
508
F I G. 5C
509   512
510
513
511
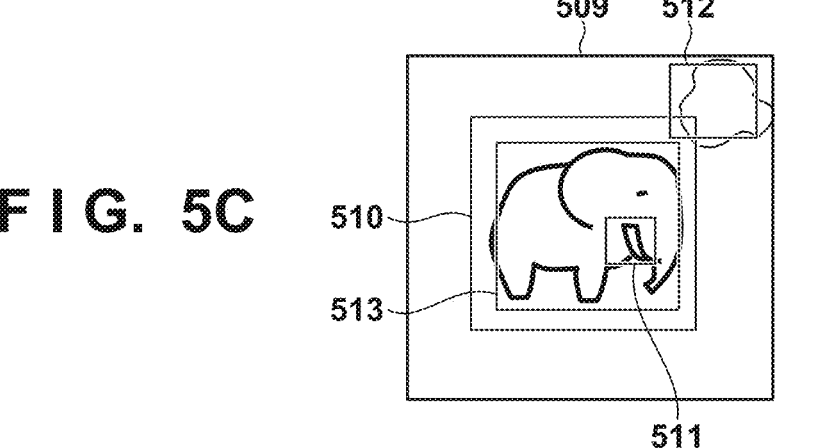

F I G. 6A
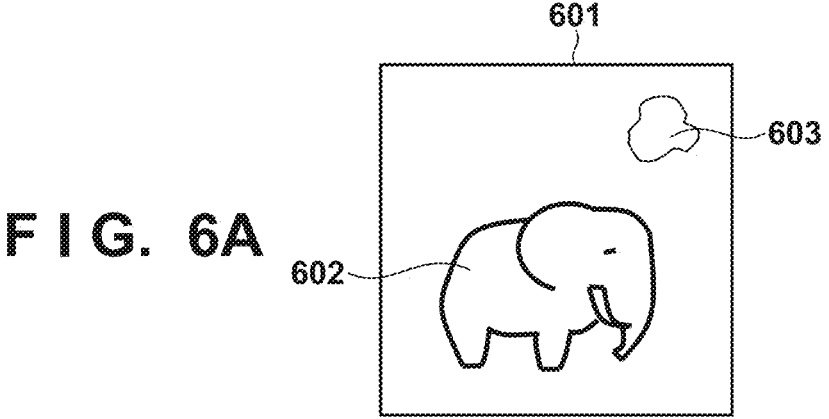
F I G. 6B
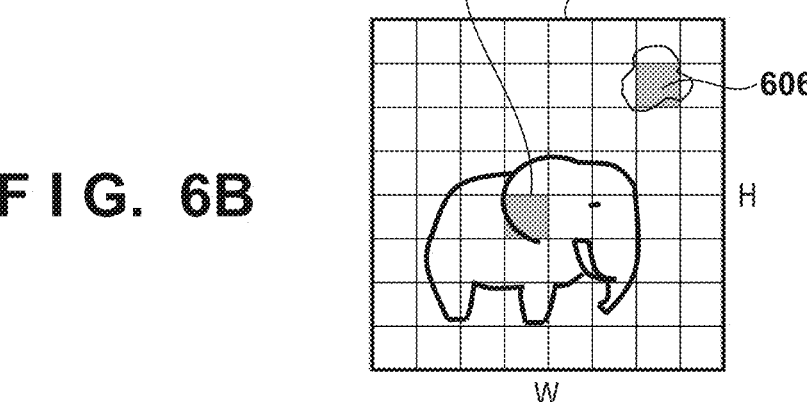

Figure 8:
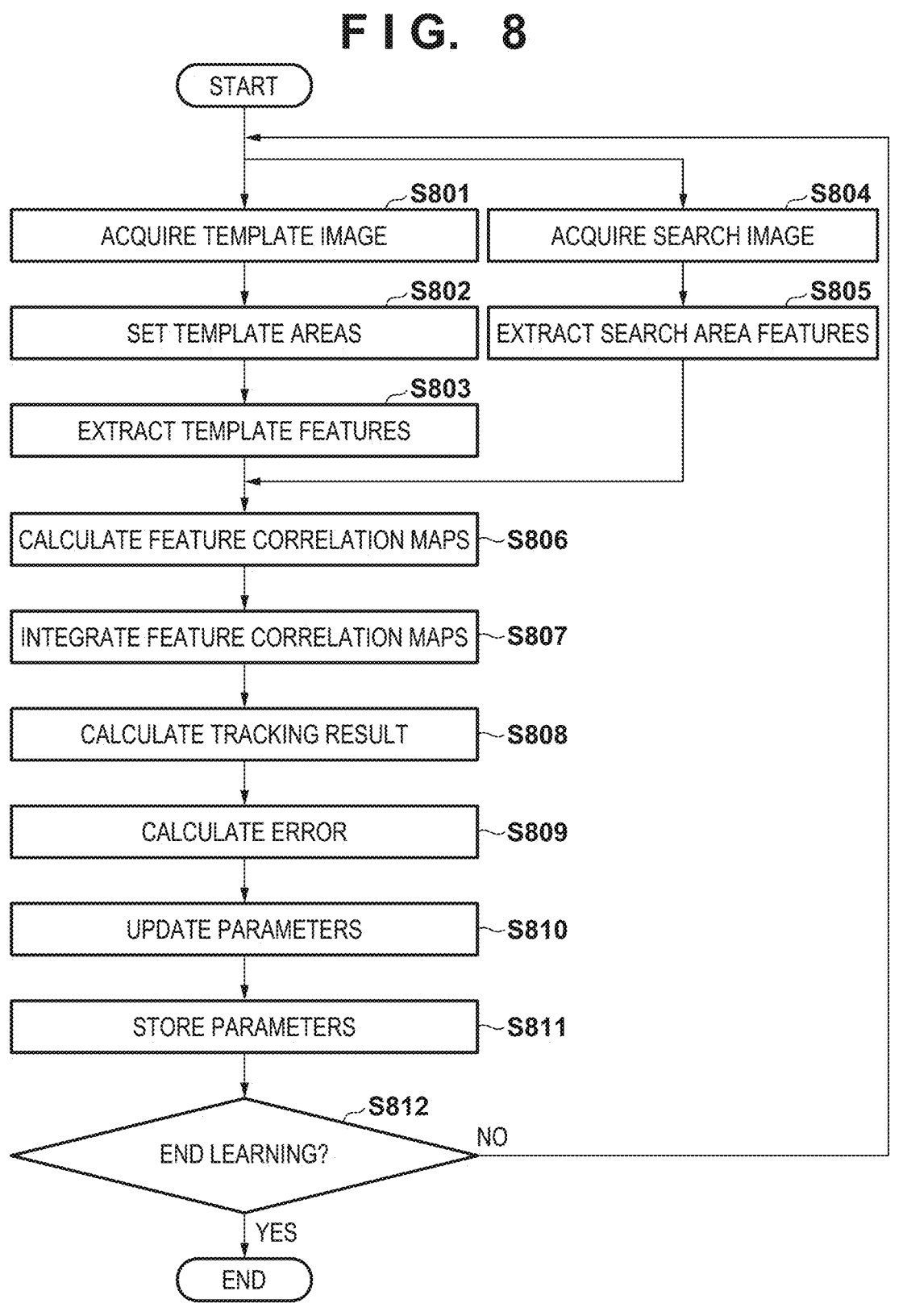

START

ACQUIRE TEMPLATE IMAGE — S801

ACQUIRE SEARCH IMAGE — S804

SET TEMPLATE AREAS — S802

EXTRACT SEARCH AREA FEATURES — S805

EXTRACT TEMPLATE FEATURES — S803

CALCULATE FEATURE CORRELATION MAPS — S806

INTEGRATE FEATURE CORRELATION MAPS — S807

CALCULATE TRACKING RESULT — S808

CALCULATE ERROR — S809

UPDATE PARAMETERS — S810

STORE PARAMETERS — S811

END LEARNING? — S812

NO

YES

END

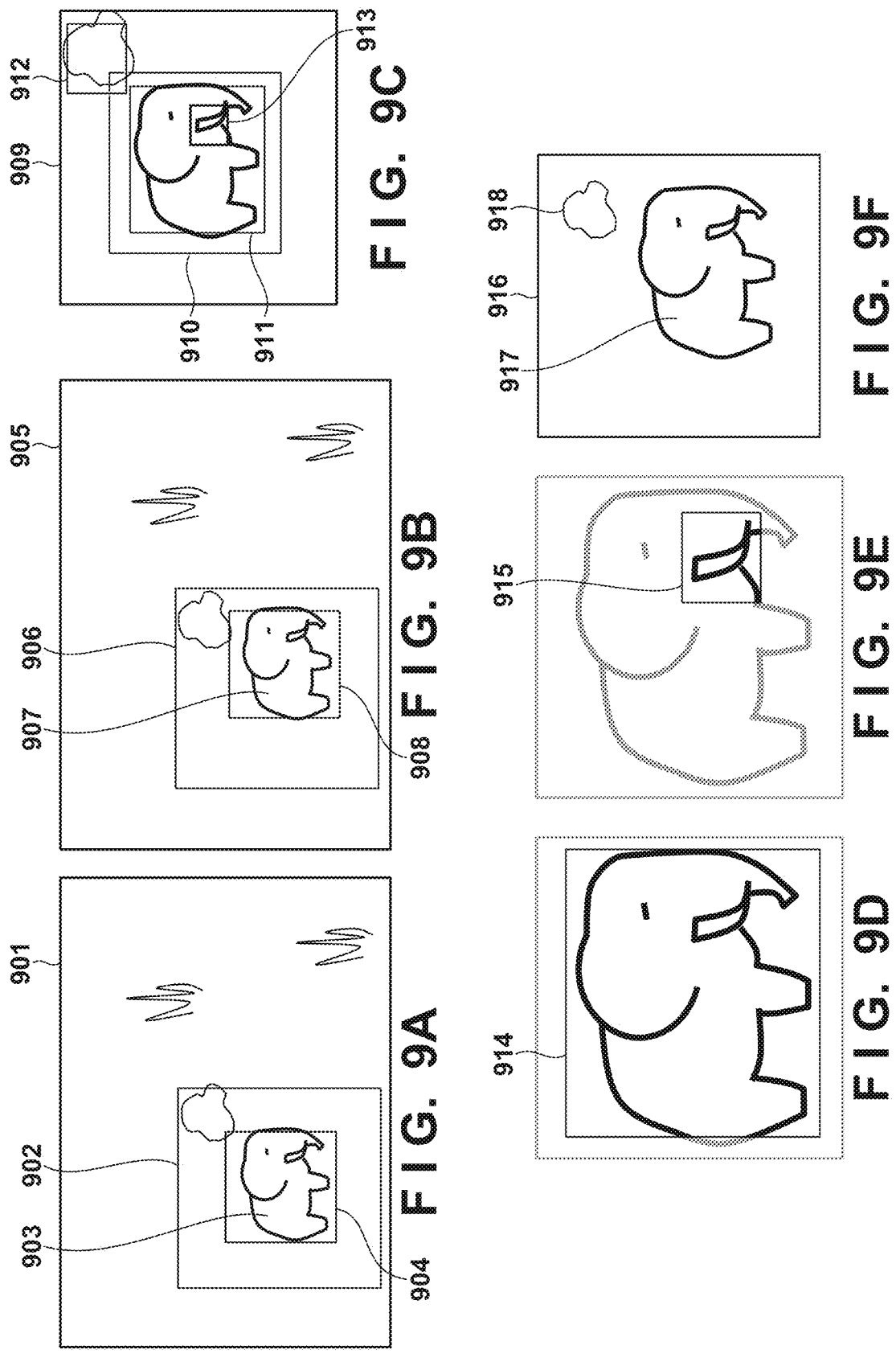

1001
F I G. 10A
1003
1002
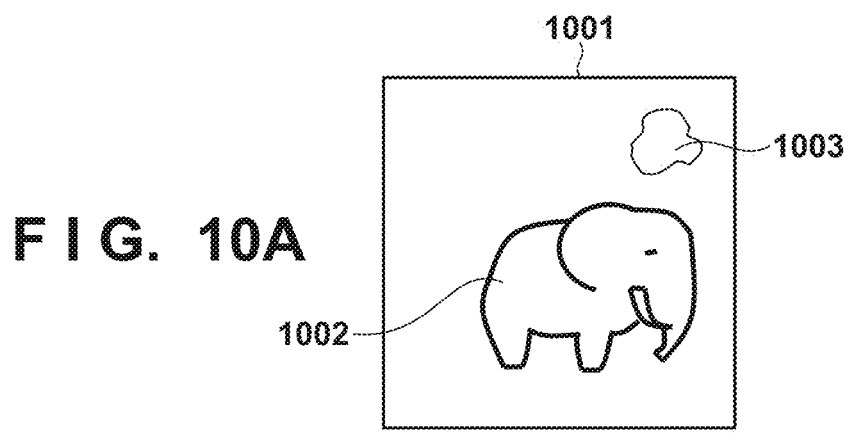
1005    1004
F I G. 10B
1006
H
W
1007    1008
F I G. 10C
1009
H
W
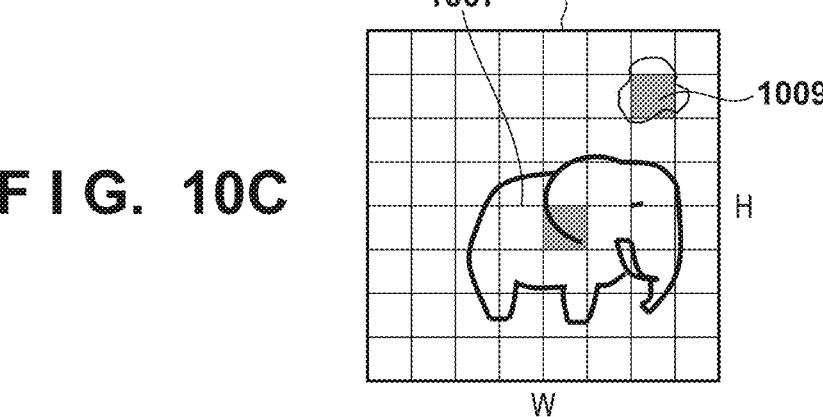

F I G. 11A
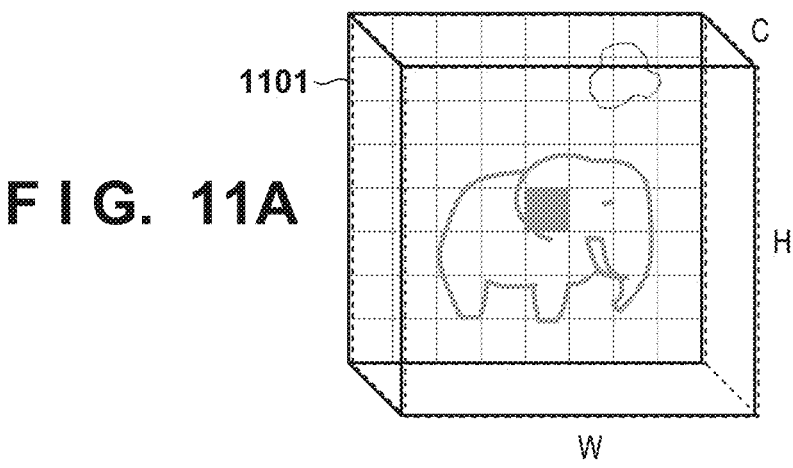
F I G. 11B
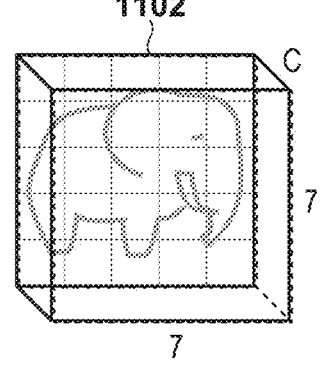
F I G. 11C
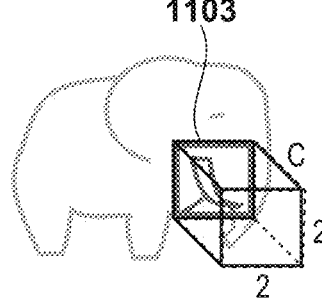

F I G. 12
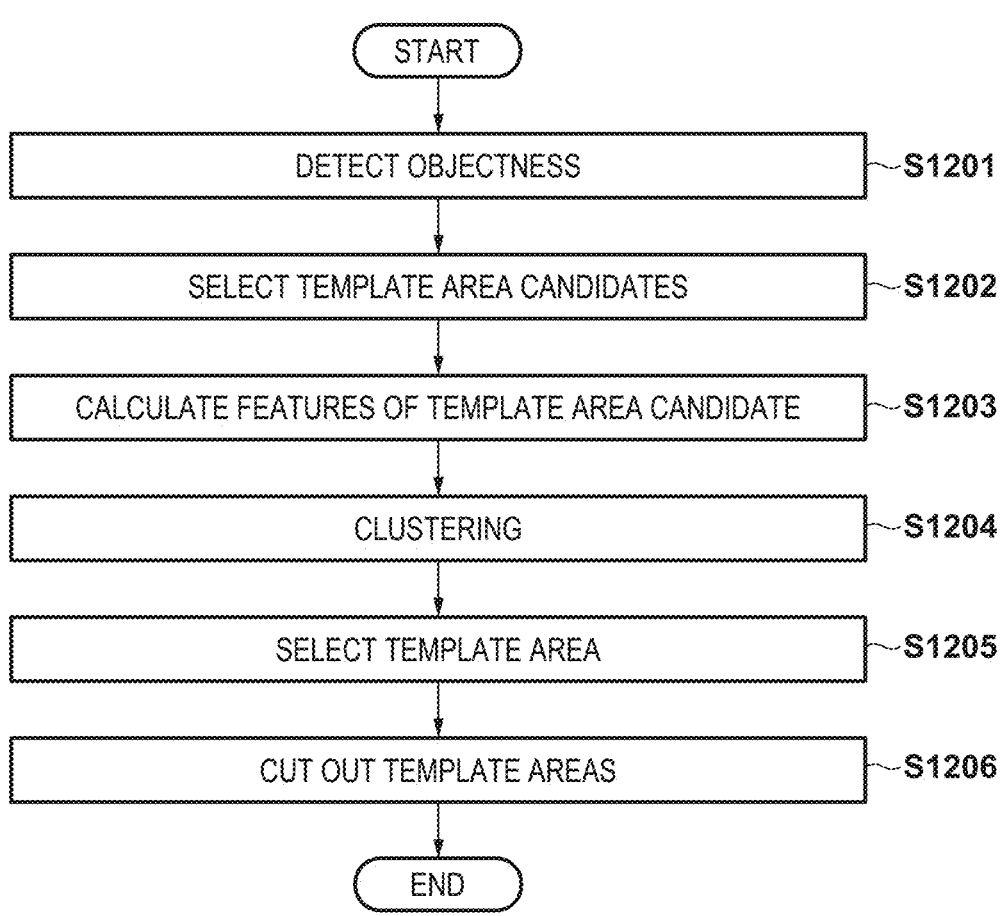

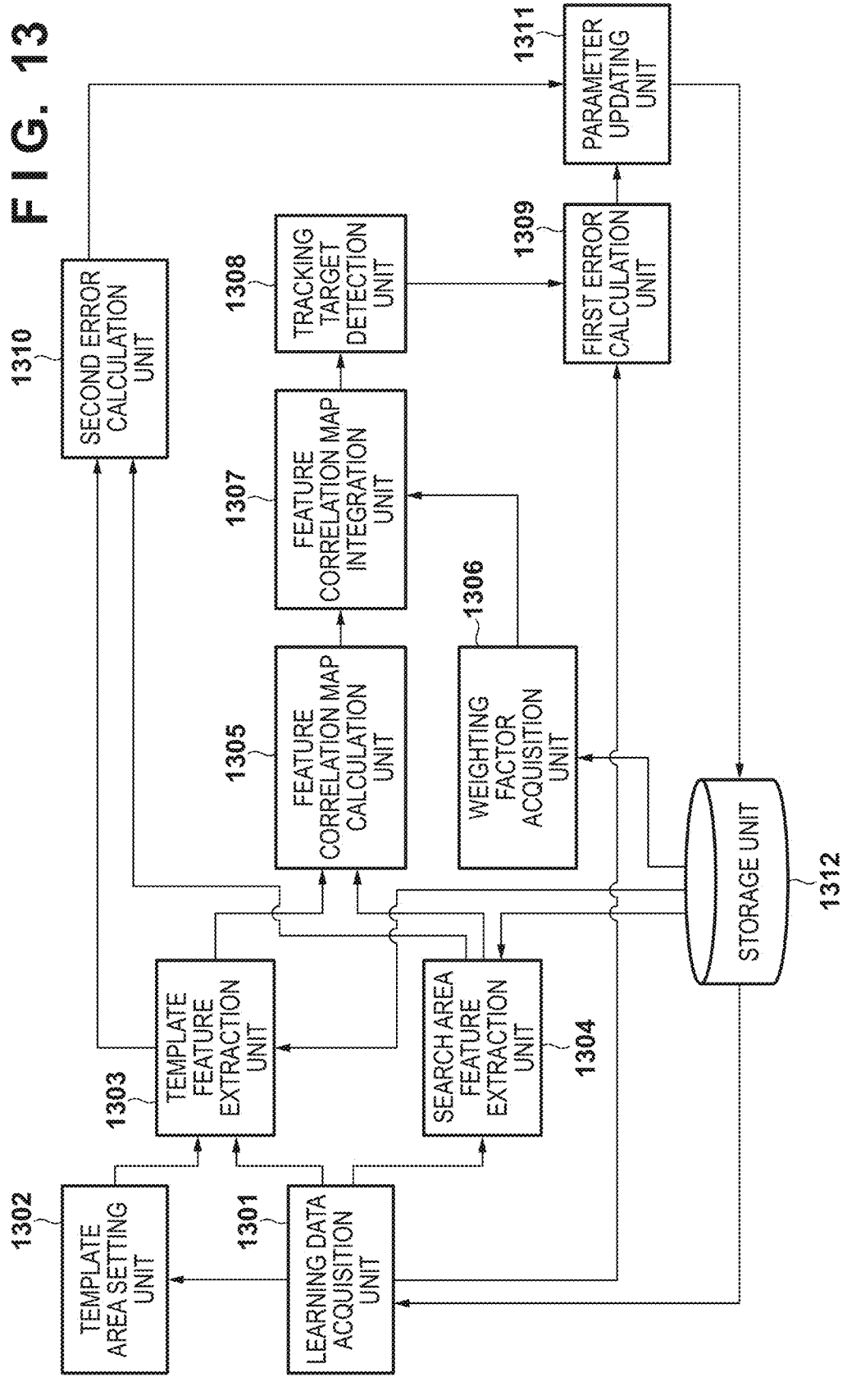
F I G. 13

INFORMATION PROCESSING APPARATUS AND CONTROL METHOD THEREOF

BACKGROUND OF THE INVENTION

Field of the Invention

The present invention relates to a technique of tracking a target object in an image.

Description of the Related Art

In recent years, techniques using Deep Neural Network (DNN) for accurately tracking a specific object in an image have received a great deal of attention. For example, in a Siam method represented by Li et al., "High Performance Visual Tracking with Siamese Region Proposal Network", CVPR2018 or the like, correlation calculation of DNN features of a reference image serving as a template of a tracking target and a search area image is performed, thereby detecting a tracking target from the search area image.

However, the reference image generally includes a background other than the tracking target, and in the above-described Siam method, the background may erroneously be captured and tracked as the feature of the tracking target. Also, since the appearance of the tracking target changes variously over time, the tracking target is readily lost due to the change. For these reasons, in the Siam method, the result of tracking readily drifts to the background.

SUMMARY OF THE INVENTION

According to one aspect of the present invention, an information processing apparatus for tracking a tracking target in a video sequence, comprises: one or more hardware processors; and one or more memories storing one or more programs configured to be executed by the one or more hardware processors, the one or more programs including instructions for: setting a first area and a second area corresponding to image areas of the tracking target, which are different from each other, for a template image included in the video sequence and including an image of the tracking target; extracting a first area feature and a second area feature, which are template features, from the first area and the second area using a feature extraction neural network (NN); extracting a search area feature from a search area image included in the video sequence and following the template image using the feature extraction NN; performing correlation calculation between each of the first area feature and the second area feature and the search area feature and deriving a first feature correlation map and a second feature correlation map, which are correlation maps; integrating the first feature correlation map and the second feature correlation map and deriving an integrated feature; and detecting the tracking target from the search area image based on the integrated feature.

The present invention enables accurate tracking of a tracking target.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a view showing the hardware configuration of an information processing apparatus;

FIG. 2 is a view showing the functional configuration of the information processing apparatus (in inference);

FIG. 4 is a flowchart of inference processing;

FIGS. 5A to 5C are views showing examples of a template image and a search area image;

FIGS. 6A and 6B are views showing examples of an input image (search area image) and an inference result (likelihood map);

FIG. 7 is a view showing the functional configuration of the information processing apparatus (in learning);

FIG. 8 is a flowchart of learning processing;

FIGS. 9A to 9F are views showing examples of a template image and a search area image;

FIGS. 10A to 10C are views showing examples of an input image (search area image), correct answer data (GT map), and an inference result (likelihood map);

FIGS. 11A to 11C are views showing examples of the feature map of a search area image;

FIG. 12 is a flowchart of template area setting; and

FIG. 13 is a view showing the functional configuration of the information processing apparatus (fifth embodiment/in learning).

DESCRIPTION OF THE EMBODIMENTS

Figure 3:
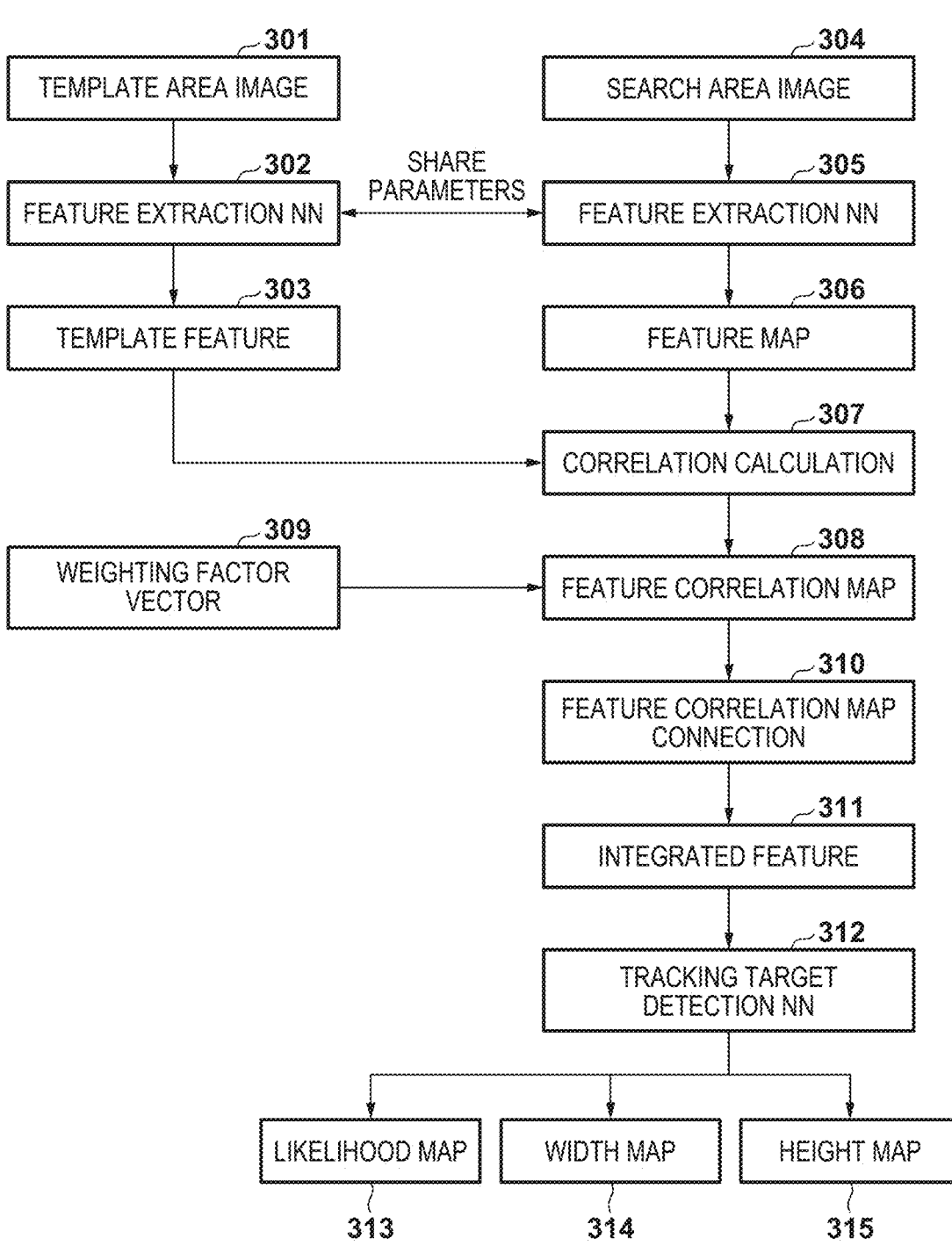
FIG. 3 is a view showing the structure of an entire neural network.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

As the first embodiment of an information processing apparatus according to the present invention, an information processing apparatus that tracks a tracking target in an image using a neural network will be described below as an example. Hereinafter, inference processing for tracking a tracking target in an image will be described first, and learning processing will be described after the description of the inference processing.

<Description of Inference Processing>
<Apparatus Configuration>

Figure 1:
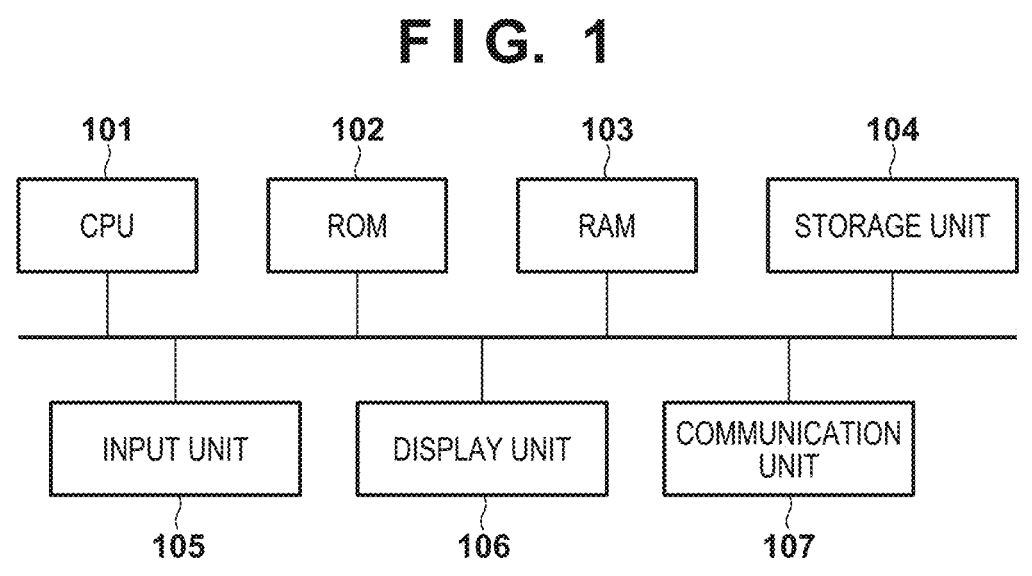

FIG. 1 is a view showing the hardware configuration of an information processing apparatus 1. The information processing apparatus 1 can be used for inference processing using a neural network. The information processing apparatus 1 can also be used for learning processing of the neural network.

A CPU 101 executes a control program stored in a ROM 102, thereby controlling the entire apparatus. A RAM 103 temporarily stores various kinds of data from constituent elements. Also, the RAM 103 is used as a work memory when the CPU 101 executes a program.

A storage unit 104 stores data as a processing target, and stores data (image data and parameters) to be used for learning. As the medium of the storage unit 104, an HDD, a flash memory, various kinds of optical media, and the like can be used. An input unit 105 is formed by a keyboard/touch panel, a dial, and the like, and accepts input from a user. The input unit 105 is used when, for example, setting a tracking target. The display unit 106 is formed by a liquid crystal display or the like, and displays an object or a tracking result to the user. A communication unit 107 is a function unit used to communicate with another apparatus such as an image capturing apparatus.

FIG. 2 is a view showing the functional configuration of the information processing apparatus in inference processing. The information processing apparatus 1 includes an image acquisition unit 201, a tracking target setting unit 202, a template area setting unit 203, a template feature extraction unit 204, and a search area feature extraction unit 205. The information processing apparatus 1 also includes a feature correlation map calculation unit 206, a weighting factor acquisition unit 207, a feature correlation map integration unit 208, a tracking target detection unit 209, and a storage unit 210. Each function component will briefly be explained.

The image acquisition unit 201 acquires a template image from a video sequence (a series of frame images). The image acquisition unit 201 also acquires a search area image following the template image (at a later time) from the same video sequence.

In accordance with an instruction designated by the input unit 105, the tracking target setting unit 202 decides a tracking target in the template image acquired by the image acquisition unit 201, and outputs a bounding box (BB) surrounding the whole tracking target area. More specifically, the tracking target may be decided by touching an object displayed on the display unit 106, the tracking target may automatically detected and set from an image captured by a camera. The tracking target decision method is not limited to these.

Based on the tracking target BB set by the tracking target setting unit 202, the template area setting unit 203 sets two or more areas to be used as templates from the template image acquired by the image acquisition unit 201, and cuts out the images of the areas. An area used as a template will be referred to as a template area, and an image cut out from the area will be referred to as a template area image hereinafter. As the area to be used for a template, an area overlapping a tracking target area is selected from a high objectness (object likelihood) area group detected using an objectness detector. As the objectness detector, a detector using a neural network represented by FCOS (literature 1) may be used.

Literature 1: Tien et al., "FCOS: Fully Convolutional One-Stage Object Detection", ICCV2019

The template feature extraction unit 204 inputs each of the plurality of template area images obtained from the template area setting unit 203 to a feature extraction neural network, and extracts a template feature.

The search area feature extraction unit 205 inputs the search area image obtained from the image acquisition unit 201 to a feature extraction neural network, and extracts a template feature.

The feature correlation map calculation unit 206 performs correlation calculation between each of the template features extracted by the template area setting unit 203 and the search area feature extracted by the search area feature extraction unit 205, and calculates a feature correlation map (derives a correlation map).

The weighting factor acquisition unit 207 acquires a weighting factor vector from the storage unit 210.

The feature correlation map integration unit 208 integrates feature correlation maps calculated by the feature correlation map calculation unit 206, and calculates an integrated feature. More specifically, after the feature correlation map calculated by the feature correlation map calculation unit 206 is weighted by multiplying it by the weighting factor acquired by the weighting factor acquisition unit 207, the feature correlation maps are then connected.

The tracking target detection unit 209 inputs the integrated feature calculated by the feature correlation map integration unit 208 to a tracking target detection neural network, and outputs a likelihood map and a size estimation map strongly reacting to the position of the tracking target object. Then, the position and size of the tracking target object are estimated using the likelihood map and the size estimation map.

The feature extraction neural network used by the template feature extraction unit 204 and the search area feature extraction unit 205 is learned in advance. The tracking target detection neural network used by the tracking target detection unit 209 is learned in advance. Furthermore, in inference, parameters learned in advance are acquired from the storage unit 210.

FIG. 3 is a view showing the structure of an entire neural network. Here, NN in FIG. 3 is short for a neural network.

Feature extraction neural networks (NNs) 302 and 305 are neural networks that extract features from an image, and correspond to the neural networks used by the template feature extraction unit 204 and the search area feature extraction unit 205, respectively. These may share parameters, or may use different parameters in the final layer or the like.

Correlation calculation 307 is processing of performing correlation calculation between features extracted by the feature extraction NNs 302 and 305, and corresponds to the feature correlation map calculation unit. Feature correlation map connection 310 is processing of connecting feature correlation maps obtained by the correlation calculation 307, and corresponds to the feature correlation map integration unit 208. A tracking target object detection neural network 312 is a neural network that estimates the position and size of the tracking target object, and corresponds to the neural network used by the tracking target detection unit 209. Each neural network is formed by convolution and nonlinear transformation such as a Rectified Linear Unit (ReLU). In this embodiment, however, the type of nonlinear transformation is not limited to this.

<Operation of Apparatus>

FIG. 4 is a flowchart of inference processing. Note that the information processing apparatus need not necessarily perform all steps to be described in this flowchart.

In step S401, the image acquisition unit 201 acquires an image (template image) including a tracking target object.

FIGS. 5A to 5C are views showing examples of a template image and a search area image. A template image 501 shown in FIG. 5A is a template image acquired by the image acquisition unit 201. The template image 501 includes a tracking target object 503. A tracking target BB 504 is a BB surrounding the tracking target object 503.

In step S402, in accordance with an instruction designated by the input unit 105, the tracking target setting unit 202 decides a tracking target in the template image acquired in step S401. More specifically, the tracking target may be decided by touching an object displayed on the display unit 106. Furthermore, for the decided tracking target, an image around the area of the tracking target object in the template image is cut out as a template image and resized based on the position and size of the tracking target. The image is cut out in a constant multiple of the size of the tracking target object with respect to the position of the tracking target object as the center. An area 502 in FIG. 5A shows an example in which the periphery of the area of the tracking target object is cut out.

In step S403, based on the tracking target BB set by the tracking target setting unit 202, the template area setting unit 203 sets two or more areas (template areas) (a first area and a second area) to be used as templates, and cuts out the images of the areas. That is, the images of two or more areas are cut out from the image cut out from the template image in step S402.

More specifically, an image is input to an objectness detector, and a plurality of BBs of detected image areas with high objectness (with a relatively high object existence likelihood) are output. These BBs are defined as a template area candidate BB group. For example, an image 509 shown in FIG. 5C is the image cut out from the template image in step S402, an area 510 is the tracking target BB, and BBs 511, 512, and 513 form the template area candidate BB group. An area whose Intersection over Union (IoU) with respect to the area 510 that is the tracking target BB is equal to or larger than a threshold is selected from the template area candidate BB group, and set as a template area. Here, the BBs 511 and 513 are selected. After that, the template areas are cut out from the area 510 as template area images. As the objectness detector, a detector using a neural network represented by FCOS (literature 1) may be used.

The number of template area images to be acquired may be fixed, and N template area images are assumed to be acquired in the following explanation. Here, IoU of two BBs (assumed to be BB1 and BB2 here) is calculated in the following way.

$$IoU = \frac{BB1 \cap BB2}{BB1 \cup BB2} \quad (1)$$

In step S404, the template feature extraction unit 204 inputs the N template area images obtained in step S403 to the feature extraction NN 302, and obtains N template features 303 (a first area feature and a second area feature) that are features corresponding to the area of the tracking target object. Here, the width, height, and channel count of a template area are defined as $W_T$, $H_T$, and $C_T$. $W_T$, $H_T$, and $C_T$ are values decided by the width, height, and channel count of the template area image, and the structure of the neural network.

In step S405, the image acquisition unit 201 acquires an image for searching for the tracking target object. For example, an image of another time in the same video sequence as that of the image selected in step S401 is acquired as an image for searching for the tracking target object. An image 505 shown in FIG. 5B is the image for searching for the tracking target object. The image 505 includes a tracking target object 507. A tracking target BB 508 is a BB surrounding the tracking target object 507.

Furthermore, based on the position and size of the tracking target object, the image acquisition unit 201 cuts out and resizes an image around the tracking target object in the image acquired in step S404. For example, the image is cut out in a constant multiple of the size of the tracking target object with respect to the position of the tracking target object obtained as the tracking result in the frame of the immediately preceding time as the center. In an early stage of tracking, the image is cut out in a constant multiple of the size of the tracking target object with respect to the position of the tracking target in the template image as the center. An area 506 shown in FIG. 5B shows an example in which the image that is the search area is cut out.

In step S406, the search area feature extraction unit 205 inputs the search area image obtained in step S405 to the feature extraction NN 305, and obtains a feature map 306 of the search area image. Here, the width, height, and channel count (W, H, and C) of the feature map are decided by the structure of the neural network. More specifically, W and H are decided in the following way. Note that C and M are integers uniquely decided by the structure of the neural network.

$$W=[\text{width of search area image}/M]$$

$$H=[\text{height of search area image}/M]$$

Note that [x] is a maximum integer not more than x.

In step S407, for each of the two or more template features obtained in step S404, the feature correlation map calculation unit 206 calculates correlation to the search area feature obtained in step S406, and calculates a feature correlation map 308. To calculate correlation, a depthwise (dw) convolution using a template feature as a kernel may be used. Also, the widths, heights, and channel counts of the feature correlation maps are all set to be equal independently of the correlation maps. For example, after zero padding of a feature map is performed, dw convolution using a template feature as a kernel is applied in stride 1.

More specifically, in zero padding, $[W_T/2]$ pixels each having a value of "0" are added to each of the left and right ends and the upper and lower ends of the feature map. Stride 1 means that the application interval to apply the template feature is one pixel, and means that, for the feature map after zero padding, the template feature is applied while sliding it by one pixel from the upper left to the lower right.

In step S408, the weighting factor acquisition unit 207 acquires a weighting factor vector 309 of the feature correlation map from the storage unit 210. The weighting factor vector 309 is an N-dimensional vector, and the value of each dimension represents the weighting factor of each of N feature correlation maps. The value of the weighting factor is decided by learning. The method of learning will be described later. The feature correlation map integration unit 208 multiplies each feature correlation map 308 obtained in step S407 by the weighting factor 309 obtained from the weighting factor acquisition unit 207. After that, the feature correlation map integration unit 208 connects the feature correlation maps in the channel direction, thereby obtaining an integrated feature 311. For example, if there exist two feature correlation maps whose width, height, and channel count are W, H, and C, the width, height, and channel count of the obtained integrated feature 311 are W, H, and 2C.

In step S409, the tracking target detection unit 209 inputs the integrated feature 311 obtained in step S408 to the tracking target detection neural network 312, and outputs a likelihood map and size maps. The position and size of the tracking target object in the search area image are estimated based on these maps. After that, the estimation result of the position and size of the tracking target object is stored in the storage unit 210.

FIGS. 6A and 6B are views showing examples of an input image (search area image) and an inference result (likelihood map). The likelihood map is a map represented by a likelihood map 603 shown in FIG. 6B, and takes real number values of 0 to 1. If pixel values at positions where the tracking target object (in this case, an elephant) exists are larger than the values of the remaining pixels in the map, tracking can correctly be performed. Size maps are two maps having the same size as the likelihood map. One size map estimates the width, and the other estimates the height. In the width estimation map, the values of pixels corresponding to a center position 604 of the tracking target object need only equal the width of the tracking target object. This also applies to the height estimation map.

In step S410, the search area feature extraction unit 205 decides whether to end the inference. The end of inference may be decided by an instruction designated by the input unit 105.

<Description of Learning Processing>

Learning processing (processing of learning the parameters of neural networks and weighting factor vectors used in the above-described inference) will be described below. In this embodiment, the learning method of the Siam method will be described.

<Apparatus Configuration>

Figure 7:
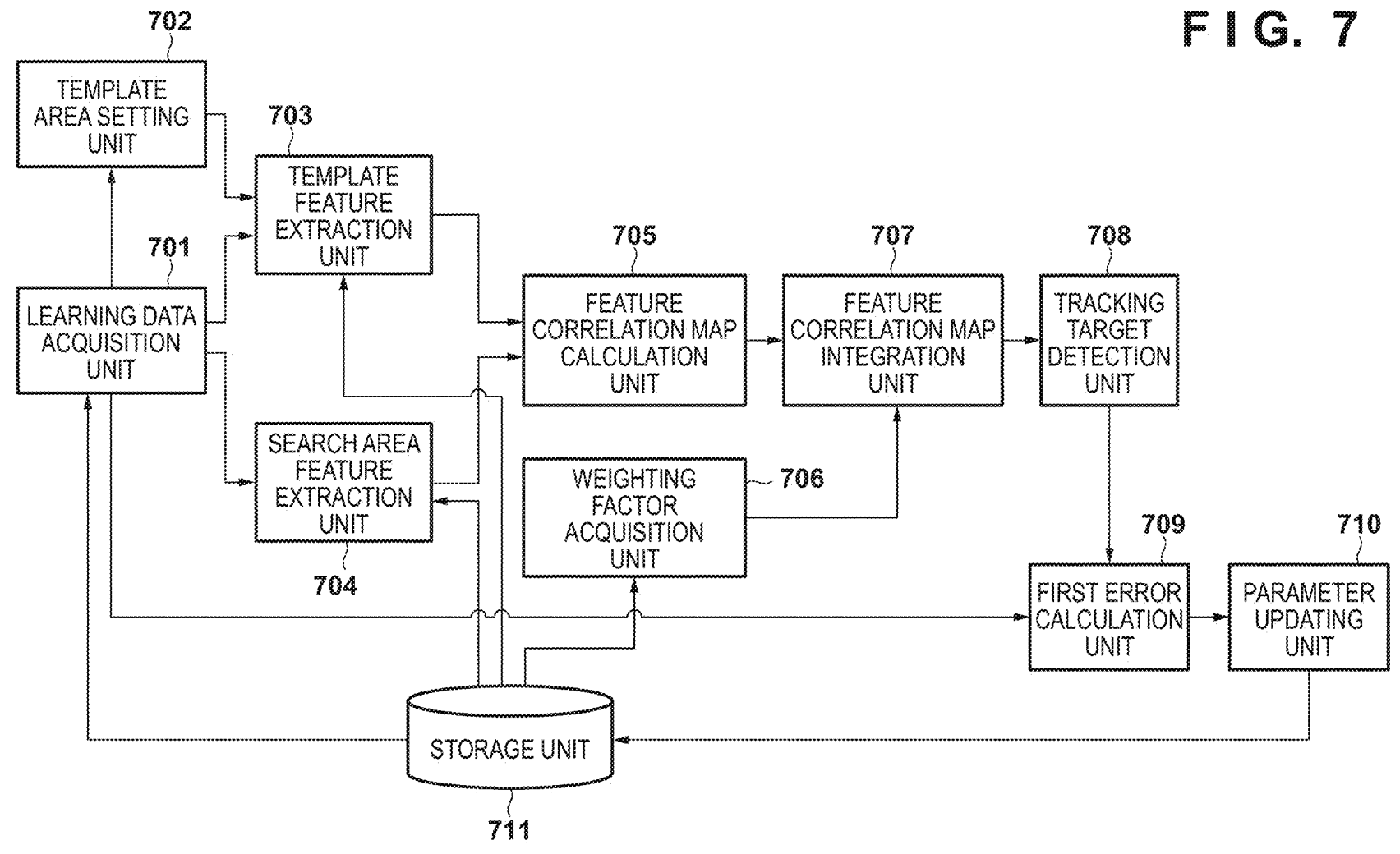

FIG. 7 is a view showing the functional configuration of the information processing apparatus in learning. The information processing apparatus 1 includes a learning data acquisition unit 701, a template area setting unit 702, a template feature extraction unit 703, and a search area feature extraction unit 704. The information processing apparatus 1 also includes a feature correlation map calculation unit 705, a weighting factor acquisition unit 706, a feature correlation map integration unit 707, a tracking target detection unit 708, a first error calculation unit 709, a parameter updating unit 710, and a storage unit 711.

As the template feature extraction unit 703 to the tracking target detection unit 708 and the storage unit 711, units common to the template feature extraction unit 204 to the tracking target detection unit 209 and the storage unit 210 in inference processing (FIG. 2) are used, respectively.

The learning data acquisition unit 701 acquires, from the same video sequence stored in the storage unit 711, two images including the same object and correct answer data of the position and size of the object existing in the images. The correct answer data will be referred to as ground truth (GT) hereinafter. The two images are a template image and a search area image.

Based on the GT acquired by the learning data acquisition unit 701, the template area setting unit 702 sets two or more template areas in the template image acquired by the learning data acquisition unit 701 and cuts out template area images. As the area to be used for a template, an area overlapping a tracking target area is selected from an object likelihood area group detected using an objectness detector, as in inference. In addition, the number of template area images to be acquired may be fixed, and N template area images are assumed to be acquired in the following explanation.

The first error calculation unit 709 calculates a loss to the estimation result of the position and size of the tracking target object. More specifically, the first error calculation unit 709 calculates the error between the estimated value of the position and size of the tracking target object obtained from the tracking target detection unit 708 and the GT obtained from the learning data acquisition unit 701.

Based on the loss obtained by the first error calculation unit 709, the parameter updating unit 710 updates the parameters of the neural networks and stores these in the storage unit 711.

<Operation of Apparatus>

FIG. 8 is a flowchart of learning processing. Note that the information processing apparatus need not necessarily perform all steps to be described in this flowchart.

In step S801, the learning data acquisition unit 701 acquires one template image and one search area image including a tracking target object from the same video sequence stored in the storage unit 711. In addition, the learning data acquisition unit 701 acquires the GT of the center position and the size (width and height) of the tracking target object existing in the template image.

FIGS. 9A to 9F are views showing examples of the template image and the search area image. A template image 901 shown in FIG. 9A is a template image acquired by the learning data acquisition unit 701. The template image 901 includes a tracking target object 903.

A tracking target BB 904 shows the GT of the position and size of the tracking target object 903 as a BB surrounding the tracking target object 903. Furthermore, based on the position and size of the tracking target, the learning data acquisition unit 701 cuts out the image around the area of the tracking target object in the template image as a template and resizes it. The image is cut out in a constant multiple of the size of the tracking target object with respect to the position of the tracking target object as the center. FIG. 9C shows an example in which the periphery (an area 902 in FIG. 9A) of the area of the tracking target object is cut out from the template image.

In step S802, based on the GT of the position and size of the tracking target object acquired by the learning data acquisition unit 701 in step S801, the template area setting unit 702 sets N template areas, cuts out the areas, and obtains template area images. That is, N template area images are obtained from the image cut out from the template image by the learning data acquisition unit 701 in step S801.

As the template area setting method, like the template area setting unit 203, an area having a large IoU to the tracking target BB is selected from template area candidates detected by objectness detection. In FIG. 9C, an image 909 is an image cut out from the template image by the learning data acquisition unit 701, and an area 910 displays the GT of the position and size of the tracking target object as a BB. Areas 911, 912, and 913 represent template area candidates. Areas selected as template areas from the template area candidates are the areas 911 and 913. An area 914 in FIG. 9D and an area 915 in FIG. 9E are examples of template area images obtained by cutting out the areas 911 and 913, and areas (areas displayed in a dark color) in the frames correspond to the template area images. Note that the template area images shown by the areas 914 and 915 are enlarged (resized) for descriptive convenience, and their sizes are different from the areas 911 and 913. In actual processing, however, resize after cutout may not be performed.

In step S803, in accordance with the same procedure as in step S404, the template feature extraction unit 703 inputs each template area image obtained in step S802 to the feature extraction NN 302, and obtains the template feature 303 of the template area image.

FIGS. 11A to 11C are views showing examples of the feature map of the search area image. A template feature 1102 shown in FIG. 11B and a template feature 1103 shown in FIG. 11C represent examples of features extracted from the template area images 914 and 915.

In step S804, in accordance with the same procedure as in step S405, the learning data acquisition unit 701 acquires an image for searching for the tracking target object. For example, an image of another time in the same video sequence as that of the image selected in step S801 is acquired as an image for searching for the tracking target object, and an image around the tracking target object is cut out and resized, thereby obtaining a search area image. An image 916 shown in FIG. 9F shows an example in which an area 906 in FIG. 9B is cut out as the search area image.

In step S805, in accordance with the same procedure as in step S406, the search area feature extraction unit 704 inputs the search area image obtained in step S804 to the feature extraction NN 305, and obtains the feature map 306 of the search area image. A feature map 1101 shown in FIG. 11A shows an example of a feature map extracted from the search area image 916 shown in FIG. 9F.

In step S806, in accordance with the same procedure as in step S407, the feature correlation map calculation unit 705 calculates correlation to the search area feature obtained in step S805 for each of the N template features obtained in step S803, and calculates the feature correlation map 308.

In step S807, the feature correlation map integration unit 707 integrates the feature correlation maps, and obtains the integrated feature 311. More specifically, first, in accordance with the same procedure as in step S408, the weighting factor acquisition unit 706 acquires the weighting factor vector 309 of the feature correlation map from the storage unit 711. The feature correlation map integration unit 707 then multiplies each feature correlation map 308 obtained in step S806 by the weighting factor vector 309 obtained from the weighting factor acquisition unit 706, and connects the feature correlation maps in the channel direction.

In step S808, in accordance with the same procedure as in step S409, the tracking target detection unit 708 inputs the integrated feature 311 obtained in step S807 to the tracking target detection neural network 312, and outputs a likelihood map and size maps. Then, the position and size of the tracking target object in the search area image are estimated based on these maps.

In step S809, the first error calculation unit 709 calculates a loss to the inference result of the position and size of the tracking target. The purpose is to make the learning progress such that the tracking target object can correctly be detected. A loss $Loss_c$ to the estimated "position" of the tracking target object and a loss $Loss_s$ to the "size" are calculated.

$Loss_c$ is defined by equation (2) below. In equation (2), letting $C_{inf}$ be the likelihood map of the position of the tracking target object obtained in step S808, and $C_{gt}$ as the map as the GT, the sum of square errors of pixels of the map $C_{inf}$ and the map $C_{gt}$ is calculated. $C_{gt}$ is a map in which a value at a position where the tracking target object exists is "1", and a value at a position other than this is "0".

$$Loss_c = \frac{1}{N}\Sigma(C_{inf} - C_{gt})^2 \tag{2}$$

FIGS. 10A to 10C are views showing examples of an input image (search area image), correct answer data (GT map), and an inference result (likelihood map). A search area image 1001 represents the same search area image as 906 in FIG. 9B. In addition, a GT map 1004 that is correct answer data, and a likelihood map 1008 that is the inference result are shown.

$Loss_s$ is defined by equation (3) below. In equation (3), the sum of square errors of pixels of output maps $W_{inf}$ and $H_{inf}$ of the width and height of the tracking target object obtained in step S808 and maps $W_{gt}$ and $H_{gt}$ that are GT is calculated.

$$Loss_s = \frac{1}{N}\Sigma(W_{inf} - W_{gt})^2 + \frac{1}{N}\Sigma(H_{inf} - H_{gt})^2 \tag{3}$$

Here, in $W_{gt}$ and $H_{gt}$, the value of the width and the value of the height of the tracking target object are embedded at the position of the tracking target object. If the loss is calculated by equation (3), learning progresses such that the width and height of the tracking target object are inferred at the position of the tracking target object even in $W_{inf}$ and $H_{inf}$. The above-described two losses are integrated, thereby obtaining equation (4).

$$Loss_{inf}=Loss_c+Loss_s \tag{4}$$

Here, the loss is described in a form of Mean Squared Error (MSE). However, the loss is not limited to MSE. A Smooth L1 loss or the like may be used. The formula of loss is not limited. A loss function concerning a position and a loss function concerning a size may be different.

In step S810, based on the loss calculated in step S809, the parameter updating unit 710 updates the parameters of the neural networks using backpropagation. The parameters updated here are the weights of convolution layers that form the feature extraction NNs 302 and 305 and the tracking target detection neural network 312 and the weighting factor vector 309 shown in FIG. 3. That is, calculation (factor calculation) of a weighting factor vector for obtaining an image feature effective for detection of the tracking target from the search area image is performed.

In step S811, the parameter updating unit 710 stores the updated parameters of the neural networks in the storage unit 711. After that, weights are loaded into the neural networks. More specifically, the template feature extraction unit 703 and the search area feature extraction unit 704 load the parameters of the feature extraction neural networks from the storage unit 711, and the tracking target detection unit 708 loads the parameters of the tracking target detection neural network from the storage unit 711. The procedure up to this point is defined as one iteration of learning.

In step S812, the parameter updating unit 710 decides whether to end the learning. When determining the end of learning, if the value of the loss obtained by equation (4) is smaller than a predetermined threshold, it may be determined to end the learning. Alternatively, if learning is performed a predetermined number of times, it may be determined to end the learning.

As described above, according to the first embodiment, using two or more partial areas including a tracking target area as templates, a neural network is learned such that correlation maps are integrated. If the thus learned neural network is used, tracking can be performed by effectively using the features of a plurality of different areas of the tracking target. In particular, it is possible to perform tracking robust to drift to the background area or the change of the appearance of the tracking target.

Modification 1-1

As Modification 1-1, an example in which a result of area division is used for template setting will be described. More specifically, in template setting of the first embodiment, a template area is set using an area divider. Here, area division means giving the same value to pixels in an image area where the same object is likely to be included in an image and dividing the whole original image into several areas.

In this modification, as in the first embodiment, when selecting a template area from a template area candidate group, an area having a large overlap with the tracking target is set as a template area. In the first embodiment, IoU between BBs is used to calculate the overlap. In this modification, a result of area division is used in place of IoU. It is thus expected that a large area of a background area is hardly used as a template area, and a tracking error that the background area is captured as a tracking target feature and tracked decreases. Note that in this modification, the template area setting unit 203 includes an area divider in addition to an objectness detector.

In step S403, when selecting a template area from a template area candidate group, the template area setting unit 203 uses a result of area division in place of IoU. First, after a template image acquired in step S401 is input to the area divider, a tracking target area is selected, and a mask image of the tracking target area is obtained. The mask image is an image which has the same size as the input image and in which a pixel value in the tracking target area takes "1", and a pixel value in other areas takes "0". How to create the mask image of the tracking target area will be described later.

Then, the template area setting unit 203 sets an area where the overlap between a template area candidate and the tracking target area is large to a template area. More specifically, the sum of the values of the mask in tracking target candidate BB area in the image is calculated, and an area whose ratio to the area of the BB area is equal to or larger than a threshold is selected.

Details of the method of creating the mask image of the tracking target area will be described next. Here, the area divider may use a Felzenszwalb method (literature 2) or the like. However, the method is not limited to this.

Literature 2: Felzenszwalb and Huttenlocher, "Efficient Graph-Based Image Segmentation", IJCV 2004

First, the template area setting unit 203 inputs the template image acquired in step S401 to the area divider. The area divider outputs an area division image in which template image is divided into a plurality of areas. In this image, the same value is given to pixels in an area where the same object is likely to exist. After that, the template area setting unit 203 selects a tracking target area from the area division image based on the tracking target BB set by the tracking target setting unit 202 in step S402. For example, an area having the largest overlap with the tracking target BB is selected. Then, the template area setting unit 203 creates an image in which a pixel value in the selected tracking target area takes "1", and a pixel value in other areas takes "0", and uses this image as the mask image of the tracking target area.

According to Modification 1-1, in template setting, a result of area division is used in place of IoU. It is thus expected that a large area of a background area is hardly used as a template area, and a tracking error that a tracker captures the background area a tracking target feature and tracks it decreases.

Modification 1-2

As Modification 1-2, an example in which a result of specific object detection is used in template setting will be described. More specifically, a detector that performs specific object detection is used to set a template area, thereby improving the performance of tracking of a specific object. For example, a plurality of parts of an object (an animal or a human), which are different from each other, are detected by detectors. More specifically, to track a human face, a face and an upper body are detected using detectors for "face"

and "upper body", and a face area and an upper body area are set as template areas. Then, a network is learned such that feature correlation maps obtained by the templates of the upper body area and the face area are integrated, and the face is tracked. This makes it possible to perform tracking with the aid of the upper body area even if the face area is hard to look due to a shielding object, and improve the face tracking performance. Concerning an inference method and a learning method, only portions different from the first embodiment will be described below.

<Inference Processing>

An example of the functional configuration in inference processing is the same as in FIG. 2. However, the template area setting unit 203 includes two or more types of specific object detectors in place of the objectness detector. Here, a face detector and an upper body detector are used.

In step S403, the template area setting unit 203 first inputs an image to the face detector, and obtains the BB of the face area of a tracking target person. Next, the upper body area of the same person is estimated. For example, an image is input to the upper body detector, and a plurality of BBs of upper body area candidates are output. A BB having a large overlap with the BB of the face area is set to the BB of the upper body area. The BB of the face area and the BB of the upper body area are set as template areas.

In step S404, the template feature extraction unit 204 inputs the two template area images obtained in step S403 to the feature extraction NN 302, and obtains the template features 303 corresponding to the face area and the upper body area.

In step S408, the feature correlation map integration unit 208 integrates feature correlation maps in the channel direction, and obtains the integrated feature 311. At this time, the order of connecting the feature correlation map corresponding to the face area and the feature correlation map corresponding to the upper body area may be decided in advance.

<Learning Processing>

An example of the functional configuration in learning processing is the same as in FIG. 7. However, unlike the first embodiment, each function unit operates as follows.

The learning data acquisition unit 701 acquires two images including the same object and the GTs of the positions and sizes of a face and an upper body existing in the images from the same video sequence stored in the storage unit 711. Here, the video sequence includes one or more human bodies, and the GTs of the face and the upper body are added to each human body.

As the template area setting unit 702, a unit common to the template area setting unit 203 is used, and this includes two or more specific object detectors. Based on the GT of the face and the GT of the upper body acquired by the learning data acquisition unit 701, the template area setting unit 702 sets template areas from the template images acquired by the learning data acquisition unit 701 and cuts out template area images.

The tracking target detection unit 708 estimates the position and size of the face. An integrated feature calculated by the feature correlation map integration unit 707 is input to the tracking target detection neural network, and a likelihood map and a size estimation map strongly reacting to the position of the tracking target object are output. The position and size of the face are then estimated using the likelihood map and the size estimation map.

The first error calculation unit 709 calculates a loss to the estimation result of the position and size of the face. More specifically, the first error calculation unit 709 calculates the error between the estimated value of the position and size obtained from the tracking target detection unit 708 and the GT of the position and size of the face obtained from the learning data acquisition unit 701.

In step S801, the learning data acquisition unit 701 acquires one template image and one search area image including the same person from the same video sequence stored in the storage unit 711, and acquires the GTs of the positions and sizes of the face and the upper body of the person existing in the image.

In step S802, the template area setting unit 702 obtains template area images based on the GTs of the positions and sizes of the face and the upper body of the same person acquired by the learning data acquisition unit 701 in step S801. That is, the face area and the upper body area are set as the template areas, and the image of each area is cut out to obtain a template area image.

In step S804, in accordance with the same procedure as in step S405, the learning data acquisition unit 701 acquires an image for searching for the tracking target object. For example, an image of another time in the same video sequence as that of the image selected in step S801 is acquired as an image for searching for the face that is the tracking target, and an area around the upper body of the person who has the face is cut out and resized, thereby obtaining a search area image.

In step S806, in accordance with the same procedure as in step S407, the feature correlation map calculation unit 705 calculates correlation to the search area feature obtained in step S805 for each of the two template features obtained in step S803, and calculates the feature correlation map 308.

In step S807, the same procedure as described in the first embodiment is performed. The feature correlation map integration unit 208 connects the feature correlation maps in the channel direction, thereby obtaining the integrated feature 311. At this time, the order of connecting the feature correlation map corresponding to the face area and the feature correlation map corresponding to the upper body area may be decided in advance, and connection may be done in the same order as in inference.

In step S808, the tracking target detection unit 708 estimates the position and size of the face. The integrated feature calculated by the feature correlation map integration unit 707 is input to the tracking target detection neural network, and a likelihood map and a size estimation map strongly reacting to the position of the face of the tracking target are output. The position and size of the face that is the tracking target are then estimated using the likelihood map and the size estimation map.

In step S809, the first error calculation unit 709 calculates a loss to the estimation result of the position and size of the face of the tracking target. More specifically, the first error calculation unit 709 calculates the error between the estimated value of the position and size obtained from the tracking target detection unit 708 and the GT of the position and size of the face obtained from the learning data acquisition unit 701.

Second Embodiment

As the second embodiment, a form in which, of detection frames by an objectness detector, an area of a large appearance count is used as a template will be described. That is, unlike the first embodiment, a partial area of a tracking target with the highest appearance frequency is set as a template area from images at a plurality of times of the same video sequence.

In the first embodiment, one image at a certain time is selected from a video sequence, and a plurality of areas objectness-detected from the image are set as template areas. However, objectness detection in the selected image does not necessarily success, and tracking may be performed using a background area that happens to be included as a key of a tracking target. Also, an area where the objectness happens to be high due to a suddenly generated shade or the like may be set as a template area. In the second embodiment, in images at a plurality of times of the same video sequence, a partial area of a tracking target with the highest appearance frequency is set as a template area, thereby reducing the possibility of occurrence of the above-described situation. This makes it possible to easily set a template area having the typical appearance of a tracking target, and more robust tracking is expected to be performed.

Concerning the procedure of inference processing according to the second embodiment, portions different from the first embodiment will be described. In step S401 of the first embodiment, an image acquisition unit 201 acquires at least two template images including the same object from at least two times in a video sequence. Then, in step S403, a template area setting unit performs template area setting in accordance with the procedure shown in the flowchart of FIG. 12.

FIG. 12 is a detailed flowchart of template area setting according to the second embodiment.

In step S1201, the template area setting unit performs object detection using an objectness detection neural network represented by FCOS (literature 1) for all the acquired template images.

In step S1202, the template area setting unit selects, from the areas detected in step S1201, areas whose IoU to a tracking target BB set in step S402 is large (having a predetermined overlap or more) as a template area candidate.

In step S1203, the template area setting unit acquires image features of each template area. The intermediate feature of the objectness detection neural network may be used as image features. The image features are all set to the same size because these are used for clustering in step S1204. For example, for an intermediate feature of the objectness detection neural network, a feature corresponding to a template area may be cut out by PrRoIPooling (literature 3).

Literature 3: Jiang et al., "Acquisition of Localization Confidence for Accurate Object Detection", ECCV2018

In step S1204, the template area setting unit performs clustering of the image features. More specifically, in the features acquired in step S1203, similar features are assigned to the same group. For the clustering, the K-means method may be used, and the method is not limited here.

In step S1205, the template area setting unit selects an area belonging to a cluster with a large appearance count as a template area. As the template area, a plurality of areas may be set, from a cluster with the largest appearance count, to template areas. Alternatively, one area with high likelihood of objectness detection may be selected from each of different clusters.

In step S1206, the template area setting unit cuts out the images of the template areas.

As described above, according to the second embodiment, a partial area of the tracking target that appears over a plurality of times is set as a template area. In addition, a plurality of partial areas are used as template areas. By the two contrivances, robust tracking can be expected to be performed as compared to the first embodiment in which only one template for the area of the entire tracking target is used from one image including the tracking target.

For example, in a case where the attitude or the like of the tracking target has a special appearance in the image selected as the template image, focusing on a partial area, it has similar appearances at all times at high possibility. In this embodiment, such a partial area is set as a template area, thereby enabling robust tracking.

Third Embodiment

As the third embodiment, a form in which a large template is hollowed out to acquire a small template will be described. This improves the efficiency of feature extraction processing.

In the first embodiment, when acquiring a plurality of template features, feature extraction using a neural network is performed for each template area image. For this reason, if template areas overlap, feature extraction is performed doubly in some areas, resulting in extra calculation cost. In the third embodiment, for the purpose of improving processing efficiency, an inclusion area feature is extracted from one area (inclusion area) including all template areas, and an area feature of each template area is then cut out. This makes it possible to complete feature extraction once and more efficiently decide a plurality of template features.

Concerning the procedure of inference processing according to the third embodiment, portions different from the first embodiment will be described. In step S403, a template area setting unit 203 selects two or more template areas. In step S404, a template feature extraction unit 204 acquires a feature map from an image cut out in step S401 using a feature extraction neural network 302.

In step S403, the template feature extraction unit 204 hollows out the feature map based on each set template area, thereby obtaining a template feature. As the method of hollowing out, a feature corresponding to the template area set in step S403 may be cut out from the feature map acquired from the image cut out in step S401 by PrRoIPooling (literature 3) or the like.

As described above, according to the third embodiment, feature extraction from a template area image is completed once, thereby suppressing the calculation cost as compared to performing feature extraction for each template area image.

Fourth Embodiment

As the fourth embodiment, a form in which two or more areas having an inclusion relationship are set as template areas will be described.

For example, a large area including a whole tracking target and a small area at the center of the tracking target are set as a large template area and a small template area, respectively. It can be considered that a template feature acquired from the large template area captures a global shape feature, and a template feature acquired from the small template area captures a local feature (color feature) such as a color. It is expected that using a neural network learned such that correlation features obtained by these are weighted and integrated, tracking with balance between the shape and the color can be performed. Also, when the template of the small area is acquired from the center of the tracking target area, it is expected that a background area is hardly included in the template, and tracking using a feature such as the color of the background area as a key of the tracking target is reduced.

In step S403, a template area setting unit 203 inputs an image to an objectness detector, and outputs one BB (BB$_1$) of an area with the highest objectness. The BB$_1$ includes the entire tracking target. Next, the template area setting unit 203 obtains a rectangular area BB$_2$ included in the BB$_1$, and sets the BB$_1$ and BB$_2$ as template areas. The BB$_2$ may be, for example, a rectangular area which has a width/height s-times (s satisfies 0<s<1) larger than the BB$_1$ and whose center matches that of the BB$_1$. Alternatively, a mask of a tracking target area may be created by the same method as described in Modification 1-1, and a BB in which all pixels are included in the tracking target area may be set as BB$_2$.

In step S404, a template feature extraction unit 204 extracts a template feature in accordance with, for example, the same procedure as in the third embodiment. First, using a feature extraction neural network 302, a feature map is acquired from an image cut out in step S401. After that, the feature map is hollowed out based on the template area set in step S403, thereby obtaining a template feature.

As described above, according to the fourth embodiment, a plurality of areas having an inclusion relationship are used as templates, and a neural network is learned such that correlation features obtained by the features of these templates are weighted and integrated. It is expected that using the thus learned neural network, tracking with balance between the shape and the color can be performed. Also, when the template of the small area is acquired from the center of the tracking target area, it is expected that a background area is hardly included in the template, and tracking using a feature such as the color of the background area as a key of the tracking target is reduced.

Fifth Embodiment

As the fifth embodiment, a form in which the degree of placing importance on color information is adjusted by changing a style loss addition method for each template will be described. More specifically, in learning processing, a restriction for adjusting the degree of placing importance on color information is explicitly imparted for each template area. This promotes learning that places importance on different information for each template area.

More specifically, in step S809, to calculate a loss used for learning of the neural network, a loss called "style loss" for adjusting the degree of placing importance on color information is used. The style loss is a loss used in a style transfer method using a CNN in, for example, Neural Style Transfer (literature 2), and is a loss that makes the colors or textures of two images close.

Style transfer is a task for generating one new image from two images, and an image is newly generated by reflecting the style (color or texture information) of one image (style image) on the other image (content image). In this method, learning is performed such that, for the new image and the texture image, pieces of color or texture information of CNN features extracted from the images become close, and for the new image and the content image, pieces of color or texture information of CNN features extracted from the images become close.

A loss used for calculation of similarity between texture information is called a style loss. The style loss can be derived by calculating color or texture information as a Gram matrix of a CNN feature and calculating the difference between two Gram matrices. In this embodiment, the style loss is used to calculate a loss, and the lower limit of the style loss is changed for each template area, thereby promoting learning that places importance on different information for each template area. As in the first embodiment, feature extraction neural networks 302 and 305 are CNNs.

FIG. 13 is a view showing the functional configuration of an information processing apparatus 1 in learning according to the fifth embodiment. A second error calculation unit 1310 is added to FIG. 7 (first embodiment). As a learning data acquisition unit 1301 to the first error calculation unit 1309, a parameter updating unit 1311, and a storage unit 1312, units common to a learning data acquisition unit 701 to a first error calculation unit 709, a parameter updating unit 710, and a storage unit 711 are used, respectively.

The procedure of learning processing according to the fifth embodiment will be described with reference to FIG. 8. Processes of steps S801 to S808 and S811 are the same as in the first embodiment.

In step S809, the first error calculation unit calculates a first error in accordance with the same procedure as in the first embodiment. Next, the second error calculation unit 1310 calculates a second error in accordance with a procedure to be described later. First, for an nth template feature $F^n$ in N template features $F^1$ to $F^N$ extracted by the template feature extraction unit 1303, the second error calculation unit 1310 cuts out a feature of the same size from a search area feature and sets it as a search area feature $G^n$. After that, Gram matrices $P^n$ and $Q^n$ are calculated for each of N sets of template features $F^n$ and search area features $G^n$. Here, elements on the ith rows/jth columns of the Gram matrices $P^n$ and $Q^n$ are calculated by $$P_{ij}^n = \Sigma_k F_{ik}^n F_{jk}^n \qquad (5)$$

$$Q_{ij}^n = \Sigma_k G_{ik}^n G_{jk}^n \qquad (6)$$

Here, $F_{ik}^n$ and $G_{ik}^n$ represent kth pixels from the upper left in (W×H) pixels of the ith channels of the features $F^n$ and $G^n$.

After that, the difference between the Gram matrices is obtained for each of the N sets of template features $F^n$ and search area features $G^n$ by equation (7). Qualitatively, the more similar the colors or textures of the template feature $F^n$ and the search area feature $G^n$ are, the smaller the difference between the Gram matrices is.

$$L_{style}^n = \frac{1}{R} \Sigma_i \Sigma_j \max\left(\left(P_{ij}^n - Q_{ij}^n\right)^2 - m\right), 0\right) \qquad (7)$$

Here, R is the number of elements of the Gram matrix. A parameter m having a large value has an effect of suppressing a decrease of the difference between the values of elements of the Gram matrices. By learning the parameter m, the degree of placing importance on color information can be changed for each template feature.

Then, a weighted sum is calculated by equation (8) and set as the second error. $w^n$ represents the weighting factor of the difference between the Gram matrices calculated by equation (7) for each of the sets of template features and search area features. $w^n$ takes a value of 0 or more.

$$L_{style} = \Sigma_n w^n L_{style}^n \qquad (8)$$

In step S810, the parameter updating unit 1311 calculates the sum of the losses calculated by the first error calculation unit 1309 and the second error calculation unit 1310, and updates parameters based on the sum of the losses. Here, the parameters of the neural networks are updated using backpropagation. The parameters updated here are the weights of convolution layers that form feature extraction neural networks 302 and 305 and a tracking target detection neural network 312 shown in FIG. 3, and the parameter m in equation (7).

As described above, according to the fifth embodiment, the degree of placing importance on color information is adjusted or suppressed depending on a template, and capturing the color information of the background as a feature of the tracking target is reduced. This can at least partially solve the problem of tracking by the Siam method.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-195012, filed Dec. 6, 2022 which is hereby incorporated by reference herein in its entirety.

What is claimed is:

1. An information processing apparatus for tracking a tracking target in a video sequence, comprising:

one or more hardware processors; and one or more memories storing one or more programs configured to be executed by the one or more hardware processors, the one or more programs including instructions for:

performing objectness detection for detecting an image area with a relatively high object existence likelihood in an image in the video sequence;

setting a first area and a second area corresponding to image areas of the tracking target, which are different from each other, for a template image included in the video sequence and including an image of the tracking target, wherein the first area and the second area are set based on the image area detected by the performing objectness detection for the template image;

extracting a first area feature and a second area feature, which are template features, from the first area and the second area using a feature extraction neural network (NN);

extracting a search area feature from a search area image included in the video sequence and following the template image using the feature extraction NN;

performing correlation calculation between each of the first area feature and the second area feature and the search area feature and deriving a first feature correlation map and a second feature correlation map, which are correlation maps;

integrating the first feature correlation map and the second feature correlation map and deriving an integrated feature; and detecting the tracking target from the search area image based on the integrated feature, wherein the objectness detection is executed for a plurality of template images, and an image feature is clustered for the image area, of the image area based on the objectness detection for the template image, having at least a predetermined overlap with the tracking target, and the first area and the second area are set based on the image area corresponding to a cluster with a large appearance count.

2. The apparatus according to claim 1, wherein the first feature correlation map and the second feature correlation map are integrated based on a weighting factor corresponding to the first feature correlation map and the second feature correlation map.

3. The apparatus according to claim 2, wherein the one or more programs further include instructions for:

calculating the weighting factor, and the calculating includes a neural network that calculates the weighting factor according to the tracking target using the search area feature.

4. The apparatus according to claim 1, wherein the one or more programs further include instructions for:

dividing the image into a plurality of areas by giving the same values to pixels which are likely to include the same object, and the first area and the second area are set based on an image area of the tracking target estimated based on area division of the template image.

5. The apparatus according to claim 1, wherein the image feature is a feature of the neural network included in the performing objectness detection.

6. The apparatus according to claim 1, wherein the tracking target is an animal, and the first area and the second area are areas corresponding to parts of the animal, which are different from each other.

7. The apparatus according to claim 1, wherein the first area is an area including the second area.

8. The apparatus according to claim 1, wherein in the extracting the first area feature and the second area feature, an inclusion area feature for an inclusion area including the first area and the second area is extracted using the feature extraction NN, and area features corresponding to the first area and the second area are cut out from the inclusion area feature, thereby extracting the first area feature and the second area feature.

9. The apparatus according to claim 2, wherein the weighting factor is derived by the detecting the tracking target by learning such that an image feature effective for detection of the tracking target is obtained from the search area feature based on the integrated feature.

10. The apparatus according to claim 1, wherein the feature extraction NN is learned such that importance is placed on a local color feature in, of the first area and the second area, a relatively small area.

11. The apparatus according to claim 1, wherein the feature extraction NN is learned such that importance is placed on a global shape feature in, of the first area and the second area, a relatively large area.

12. A control method of an information processing apparatus for tracking a tracking target in a video sequence, comprising:

performing objectness detection for detecting an image area with a relatively high object existence likelihood in an image in the video sequence;

setting a first area and a second area corresponding to image areas of the tracking target, which are different from each other, for a template image included in the video sequence and including an image of the tracking target, wherein the first area and the second area are set based on the image area detected by the performing objectness detection for the template image;

extracting a first area feature and a second area feature, which are template features, from the first area and the second area using a feature extraction neural network (NN);

extracting a search area feature from a search area image included in the video sequence and following the template image using the feature extraction NN;

performing correlation calculation between each of the first area feature and the second area feature and the search area feature and deriving a first feature correlation map and a second feature correlation map, which are correlation maps;

integrating the first feature correlation map and the second feature correlation map and deriving an integrated feature;

detecting the tracking target from the search area image based on the integrated feature, wherein the objectness detection is executed for a plurality of template images; and clustering an image feature for the image area, of the image area based on the objectness detection for the template image, having at least a predetermined overlap with the tracking target, and the first area and the second area are set based on the image area corresponding to a cluster with a large appearance count.

13. A non-transitory computer-readable recording medium storing a program that, when executed by a computer, causes the computer to perform a control method of an information processing apparatus for tracking a tracking target in a video sequence, comprising:

performing objectness detection for detecting an image area with a relatively high object existence likelihood in an image in the video sequence;

setting a first area and a second area corresponding to image areas of the tracking target, which are different from each other, for a template image included in the video sequence and including an image of the tracking target, wherein the first area and the second area are set based on the image area detected by the performing objectness detection for the template image;

extracting a first area feature and a second area feature, which are template features, from the first area and the second area using a feature extraction neural network (NN);

extracting a search area feature from a search area image included in the video sequence and following the template image using the feature extraction NN;

performing correlation calculation between each of the first area feature and the second area feature and the search area feature and deriving a first feature correlation map and a second feature correlation map, which are correlation maps;

integrating the first feature correlation map and the second feature correlation map and deriving an integrated feature;

detecting the tracking target from the search area image based on the integrated feature, wherein the objectness detection is executed for a plurality of template images; and clustering an image feature for the image area, of the image area based on the objectness detection for the template image, having at least a predetermined overlap with the tracking target, and the first area and the second area are set based on the image area corresponding to a cluster with a large appearance count.

* * * * *